(12) United States Patent
Sajassi

(10) Patent No.: US 8,213,435 B2
(45) Date of Patent: Jul. 3, 2012

(54) COMPREHENSIVE MODEL FOR VPLS

(75) Inventor: Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 1018 days.

(21) Appl. No.: 11/117,250

(22) Filed: Apr. 28, 2005

(65) Prior Publication Data

US 2006/0245436 A1    Nov. 2, 2006

(51) Int. Cl.
*H04L 12/28* (2006.01)
*G06F 15/16* (2006.01)

(52) U.S. Cl. .................. 370/395.53; 709/227
(58) Field of Classification Search ............. 370/395.53
See application file for complete search history.

(56) References Cited

U.S. PATENT DOCUMENTS

| | | |
|---|---|---|
| 5,331,637 A | 7/1994 | Francis et al. |
| 5,818,842 A | 10/1998 | Burwell et al. |
| 5,848,227 A | 12/1998 | Sheu |
| 6,055,364 A | 4/2000 | Speakman et al. |
| 6,073,176 A | 6/2000 | Baindur et al. |
| 6,078,590 A | 6/2000 | Farinacci et al. |
| 6,188,694 B1 | 2/2001 | Fine et al. |
| 6,301,244 B1 | 10/2001 | Huang et al. |
| 6,304,575 B1 | 10/2001 | Carroll et al. |
| 6,308,282 B1 | 10/2001 | Huang |
| 6,373,838 B1 | 4/2002 | Law et al. |
| 6,424,657 B1 | 7/2002 | Voit et al. |
| 6,430,621 B1 | 8/2002 | Srikanth et al. |
| 6,470,025 B1 | 10/2002 | Wilson et al. |
| 6,484,209 B1 | 11/2002 | Momirov |
| 6,502,140 B1 | 12/2002 | Boivie |
| 6,519,231 B1 | 2/2003 | Ding et al. |

(Continued)

FOREIGN PATENT DOCUMENTS

WO    WO 03/005648    1/2003

(Continued)

OTHER PUBLICATIONS

Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.

(Continued)

*Primary Examiner* — John Blanton
(74) *Attorney, Agent, or Firm* — Baker Botts L.L.P.

(57) ABSTRACT

A VPLS model is implemented in a network-facing provider edge (n-PE) device configured to receive a packet from an access network; the packet having a first Virtual Local Area Network (VLAN) tag of a first predetermined bit length. The n-PE device mapping the service instance identifier of the first VLAN tag into a second VLAN tag of a second predetermined bit length greater than the first predetermined bit length, the second VLAN tag identifying a Virtual Private LAN Service (VPLS) instance. The n-PE device then sends the packet with the second VLAN tag across a service provider (SP) core network via a pseudowire (PW) that functions as a logical link to another PE device. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

17 Claims, 4 Drawing Sheets

U.S. PATENT DOCUMENTS

| | | |
|---|---|---|
| 6,611,869 B1 | 8/2003 | Eschelbeck et al. |
| 6,667,982 B2 | 12/2003 | Christie et al. |
| 6,668,282 B1 | 12/2003 | Booth, III et al. |
| 6,732,189 B1 | 5/2004 | Novaes |
| 6,763,469 B1 | 7/2004 | Daniely |
| 6,785,232 B1 | 8/2004 | Kotser et al. |
| 6,785,265 B2 | 8/2004 | White et al. |
| 6,789,121 B2 * | 9/2004 | Lamberton et al. ............ 709/227 |
| 6,798,775 B1 | 9/2004 | Bordonaro |
| 6,801,533 B1 | 10/2004 | Barkley |
| 6,813,268 B1 | 11/2004 | Kalkunte et al. |
| 6,826,698 B1 | 11/2004 | Minkin et al. |
| 6,829,252 B1 | 12/2004 | Lewin et al. |
| 6,839,348 B2 * | 1/2005 | Tang et al. ..................... 370/390 |
| 6,850,521 B1 | 2/2005 | Kadambi et al. |
| 6,850,542 B2 | 2/2005 | Tzeng |
| 6,852,542 B2 | 2/2005 | Mandel et al. |
| 6,879,594 B1 | 4/2005 | Lee et al. |
| 6,882,643 B1 | 4/2005 | Mauger et al. |
| 6,892,309 B2 | 5/2005 | Richmond et al. |
| 6,954,436 B1 | 10/2005 | Yip |
| 7,009,983 B2 | 3/2006 | Mancour |
| 7,016,351 B1 | 3/2006 | Farinacci et al. |
| 7,047,304 B2 | 5/2006 | Senapati et al. |
| 7,092,389 B2 | 8/2006 | Chase et al. |
| 7,113,512 B1 | 9/2006 | Holmgren et al. |
| 7,116,665 B2 | 10/2006 | Balay et al. |
| 7,173,934 B2 | 2/2007 | Lapuh et al. |
| 7,277,936 B2 | 10/2007 | Frietsch |
| 7,310,342 B2 | 12/2007 | Rouleau |
| 7,315,554 B2 | 1/2008 | Baum et al. |
| 7,339,929 B2 | 3/2008 | Zelig et al. |
| 7,345,991 B1 | 3/2008 | Shabtay et al. |
| 7,408,936 B2 | 8/2008 | Ge et al. |
| 7,466,703 B1 | 12/2008 | Arunachalam et al. |
| 7,693,078 B2 | 4/2010 | Gonda |
| 7,698,456 B2 | 4/2010 | Guichard et al. |
| 7,701,936 B2 | 4/2010 | Hongal et al. |
| 7,843,917 B2 | 11/2010 | Brockners |
| 2002/0032780 A1 | 3/2002 | Moore et al. |
| 2002/0087721 A1 * | 7/2002 | Sato et al. ..................... 709/238 |
| 2002/0156612 A1 | 10/2002 | Schulter et al. |
| 2002/0156919 A1 | 10/2002 | Maeno |
| 2002/0196795 A1 | 12/2002 | Higashiyama |
| 2003/0012183 A1 | 1/2003 | Butler |
| 2003/0036375 A1 | 2/2003 | Chen et al. |
| 2003/0101243 A1 | 5/2003 | Donahue et al. |
| 2003/0110268 A1 | 6/2003 | Kermarec et al. |
| 2003/0112781 A1 | 6/2003 | Kermode et al. |
| 2003/0142674 A1 | 7/2003 | Casey |
| 2003/0154259 A1 | 8/2003 | Lamberton et al. |
| 2003/0177221 A1 | 9/2003 | Ould-Brahim et al. |
| 2004/0078469 A1 * | 4/2004 | Ishwar et al. ................. 709/227 |
| 2004/0081171 A1 * | 4/2004 | Finn ........................ 370/395.53 |
| 2004/0095940 A1 | 5/2004 | Yuan et al. |
| 2004/0102182 A1 | 5/2004 | Reith et al. |
| 2004/0107382 A1 | 6/2004 | Doverspike et al. |
| 2004/0125809 A1 | 7/2004 | Jeng |
| 2004/0133619 A1 | 7/2004 | Zelig et al. |
| 2004/0141501 A1 | 7/2004 | Adams et al. |
| 2004/0151180 A1 | 8/2004 | Hu et al. |
| 2004/0158735 A1 | 8/2004 | Roese |
| 2004/0165525 A1 | 8/2004 | Burak |
| 2004/0165600 A1 * | 8/2004 | Lee ........................ 370/395.53 |
| 2004/0172559 A1 | 9/2004 | Luo et al. |
| 2004/0213201 A1 | 10/2004 | Osterlund |
| 2004/0228291 A1 | 11/2004 | Huslak et al. |
| 2004/0230444 A1 | 11/2004 | Holt et al. |
| 2004/0233891 A1 | 11/2004 | Regan |
| 2004/0264364 A1 | 12/2004 | Sato |
| 2005/0007951 A1 | 1/2005 | Lapuh et al. |
| 2005/0025143 A1 | 2/2005 | Chen et al. |
| 2005/0030975 A1 | 2/2005 | Wright et al. |
| 2005/0044265 A1 | 2/2005 | Vinel et al. |
| 2005/0063397 A1 | 3/2005 | Wu et al. |
| 2005/0068972 A1 | 3/2005 | Burns et al. |
| 2005/0089047 A1 | 4/2005 | Ould-Brahim et al. |
| 2005/0099949 A1 | 5/2005 | Mohan et al. |
| 2005/0152370 A1 | 7/2005 | Meehan et al. |
| 2005/0157664 A1 | 7/2005 | Baum |
| 2005/0157751 A1 | 7/2005 | Rabie et al. |
| 2005/0160180 A1 | 7/2005 | Rabjie et al. |
| 2005/0163049 A1 | 7/2005 | Yazaki et al. |
| 2005/0175022 A1 | 8/2005 | Nishimura et al. |
| 2005/0190773 A1 | 9/2005 | Yang et al. |
| 2005/0193385 A1 * | 9/2005 | de Heer et al. ................. 717/168 |
| 2005/0239445 A1 | 10/2005 | Karaoguz et al. |
| 2005/0249124 A1 | 11/2005 | Elie-Dit-Cosaque et al. |
| 2005/0265329 A1 | 12/2005 | Havala et al. |
| 2005/0286503 A1 | 12/2005 | Oda et al. |
| 2006/0007867 A1 | 1/2006 | Elie-Dit-Cosaque et al. |
| 2006/0092847 A1 | 5/2006 | Mohan et al. |
| 2006/0098607 A1 | 5/2006 | Zeng |
| 2006/0109802 A1 * | 5/2006 | Zelig et al. .................... 370/258 |
| 2006/0126496 A1 | 6/2006 | Filsfils et al. |
| 2006/0182037 A1 | 8/2006 | Chen et al. |
| 2006/0198323 A1 | 9/2006 | Finn |
| 2006/0248227 A1 | 11/2006 | Hato |
| 2006/0248277 A1 | 11/2006 | Pande |
| 2006/0262794 A1 | 11/2006 | Livet et al. |
| 2006/0285500 A1 | 12/2006 | Booth |
| 2006/0285501 A1 | 12/2006 | Damm |
| 2007/0076719 A1 | 4/2007 | Allan et al. |
| 2007/0133564 A1 | 6/2007 | Chun et al. |
| 2007/0274321 A1 | 11/2007 | Jonsson et al. |
| 2008/0062999 A1 | 3/2008 | Platnic |
| 2008/0144657 A1 | 6/2008 | Li |
| 2008/0172497 A1 | 7/2008 | Mohan et al. |
| 2009/0019469 A1 | 1/2009 | Foti et al. |
| 2009/0129386 A1 | 5/2009 | Rune |

FOREIGN PATENT DOCUMENTS

| | | |
|---|---|---|
| WO | WO 2005/034441 | 4/2005 |
| WO | WO 2007/031002 A | 3/2007 |
| WO | WO 2008/089370 | 7/2008 |

OTHER PUBLICATIONS

Fox et al., RFC2685, Sep. 1999, http://www.faqs.org/rfcs/rfc2685.html.

Pseudo-Wire Edge-To Edge (PWE3) Working Group, Simon Delord, UECOMM; Philippe Niger, France Telecom; Yuichi Ikejiri, Yuichiro Wada, NTT Debor: "PWE3 Applications & OAM Scenarios; draft-delord-pwe3-oam-applications 02.txt" Standard-Working-Draft, Internet Engineering Task Force, IETF, CH, No. 2, Oct. 1, 2005, XP015042128 ISSN: 0000-0004 abstract p. 10, paragraph 3 Section 3.1.1.1. on pp. 12-13; http://ftp.ist.utl.pt/pub/drafts/draft-delord-pwe3-oam-applications-02.txt.

Light Reading, Inc., Distributed-Edge Artecture, Nov. 25, 2003; http://www.lightreading.com/document.asp?site=lightreading&doc_id=43679&page_number=4.

Landron, Use of the IEEE Assigned Type Field with IEEE std 802.3, 1998 Edition Local and Metropolian Area Networks, Apr. 16, 2004; http://standards.ieee.org/regauth/ethertype/type-tut.html.

Marc Lasserre et al., "Virtual Private LAN Services over MPLS", Mar. 2003, Internet Draft Document, pp. 4-22; http://tools.ietf.org/html/draft-lasserre-vkompella-ppvpn-vpls-04.

Wolfe, [dhcwg] Publication of draft-droms-agentopt-8021x-00.txt, Nov. 22, 2001, IETF.

Cisco, Delivering Multicast Vidoe over Asymmetric Digital Subscriber Line, 1999, Cisco.

Flannagan et al., Cisco Catalyst QoS; Quality of Service in Campus Networks, Jun. 6, 2003, Cisco Press, chapter 8, section 4.

Chiruvolu et al., "Issues and Approaches on Extending Ethernet Beyond LANs", Ieee Communications Magazine, Mar. 2004, p. 80-86.

\* cited by examiner

COMPREHENSIVE MODEL FOR VPLS

RELATED APPLICATIONS

The present application is related to application Ser. Nos. 11/117,016 filed Apr. 28, 2005, entitled, "Metro Ethernet Network With Scaled Broadcast And Service Instance Domains"; 11/117,017 filed Apr. 28, 2005, entitled, "System And Method For DSL Subscriber Identification Over Ethernet Network"; and 11/117,249 filed Apr. 28, 2005, entitled, "Scalable System And Method For DSL Subscriber Traffic Over An Ethernet Network", which applications are assigned to the assignee of the present application.

FIELD OF THE INVENTION

The present invention relates generally to digital computer network technology; more particularly, to methods and apparatus for providing Local Area Network (LAN) emulation services over Internet protocol (IP) networks.

BACKGROUND OF THE INVENTION

A LAN is a high-speed network (typically 10 to 1000 Mbps) that supports many computers connected over a limited distance (e.g., under a few hundred meters). Typically, a LAN spans a single building. U.S. Pat. No. 6,757,286 provides a general description of a LAN segment. A Virtual Local Area Network (VLAN) is mechanism by which a group of devices on one or more LANs that are configured using management software so that they can communicate as if they were attached to the same LAN, when in fact they are located on a number of different LAN segments. Because VLANs are based on logical instead of physical connections, they are extremely flexible.

The IEEE 802.1Q specification defines a standard for Virtual LAN and its associated Ethernet frame format. Broadcast and multicast frames are typically constrained by VLAN boundaries such that only devices whose ports are members of the same VLAN see those frames. Since 802.1Q VLANs commonly span many switches across different LAN segments, sharing of Virtual LANs by a common set of infrastructure switches is achieved by inserting a VLAN tag into the Ethernet frame. For example, according to the existing standard, a VLAN tag with 12-bit VLAN identifier (VLAN ID) is inserted into an Ethernet frame. This VLAN ID may be used to specify the broadcast domain and to identify the customer associated with a particular VLAN. The customer identifier is frequently referred to as the service instance domain since it identifies the service provided for a particular customer. In a typical service provider (SP) metropolitan area network (MAN) the broadcast domain constrains the scope of traffic among network devices such that data packets are not multicast to all devices connected to the network. A system and method for efficiently distributing multicast messages within computer networks configured to have one or more VLAN domains is disclosed in U.S. Pat. No. 6,839,348.

A Virtual Private Network (VPN) enables IP traffic (the Internet is basically a conglomeration of WANs) to travel securely over a public Transmission Control Protocol (TCP)/IP network by encrypting all traffic from one network to another. A VPN uses "tunneling" to encrypt all information at the IP level. In a Layer 3 IP VPN, customer sites are connected via IP routers (e.g., provider edge (PE) devices and nodes) that can communicate privately over a shared backbone as if they are using their own private network. Multi-protocol label switching (MPLS) Border Gateway Protocol (BGP) networks are one type of L3VPN solution. An example of an IP-based Virtual Private Network is disclosed in U.S. Pat. No. 6,693,878. U.S. Pat. No. 6,665,273 describes a MPLS system within a network device for traffic engineering.

One problem associated with existing IEEE 802.1 specifications is that the 12-bit VLAN ID can only support a combined total of up to 4,094 broadcast domains and service instance domains. The 4K VLAN ID space thus limits the number of VLANs or VPNs that can be handled, and is inadequate for operations over a SP MAN/WAN network. A proposed solution to the scalability problem imposed by the 4K VLAN ID space limitation is described in U.S. Patent Application Publication 2004/0165600.

Virtual Private LAN Service (VPLS) has recently emerged to meet the need to connect geographically dispersed locations with a protocol-transparent, any-to-any connectivity service. VPLS is an architecture that delivers Layer 2 service that in all respects emulates an Ethernet LAN across a WAN and inherits the scaling characteristics of a LAN. All sites in a VPLS instance appear to be on the same LAN, regardless of location. In other words, with VPLS, customers can communicate as if they were connected via a private Ethernet LAN segment. Basically, VPLS offers a MPLS-based approach with multipoint connectivity for L2 services, i.e., multipoint Ethernet LAN services, often referred to as Transparent LAN Service (TLS). VPLS thus supports the connection of multiple sites in a single broadcast domain over a managed IP/MPLS network. Since a VPLS is normally provided over a service provider MAN/WAN network, it therefore needs to scale to accommodate a very large number of VPNs (e.g., a large number of customers, numerous services for each customer, and a large number of customer sites).

Conceptually, VPLS can be thought of as an emulated Ethernet LAN network with each Virtual Switch Instance (VSI) being analogous to a virtual Ethernet switch. Current VPLS models are described in the Internet Engineering Task Force (IETF) working group (WG) documents draft-ietf-l2vpn-vpls-ldp-03.txt and draft-ietf-l2vpn-vpls-bpg-02.txt, which are herein incorporated by reference. These documents address the aforementioned scalability problem in terms of the number of VPNs that can be supported. These VPLS models, however, create additional problems in terms of Operations and Management (OAM) maintainability and scalability because of the very large number of pseudowire (PW) meshes required.

In the VPLS model described in the IETF draft-ietf-l2vpn-vpls-ldp-03.txt, a VPLS instance has a filtering database for supporting its own MAC address domain, and uses a set of PWs per service instance for defining the broadcast domain of the L2 VPN. It also uses split horizon mechanism on each set of PWs to prevent loops in the MPLS/IP network. Since the current model uses a set of PWs per L2 VPN, the number of PWs that need to be supported per PE can be very large, i.e., on the order of 100K or 1M (e.g., 10K L2 VPNs with 10-100 sites per VPN). Considering existing requirements for partial mesh detection and timing constraints, it is extremely difficult to run a fast failure detection mechanism on a per PW basis for such a large number of PWs and exchange state information among PEs for partial mesh detection.

Thus, what is needed is a new VPLS architectural model that reduces the number of PWs in the network while maintaining scalability and support for a large number of VPNs as well as OAM.

BRIEF DESCRIPTION OF THE DRAWINGS

The present invention will be understood more fully from the detailed description that follows and from the accompa

DETAILED DESCRIPTION

A VPLS model that utilizes an extended VLAN (E-VLAN) mechanism that tremendously reduces the number of PWs in a VPLS system is described. In the following description specific details are set forth, such as device types, protocols, configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Each node typically comprises a number of basic subsystems including a processor subsystem, a main memory and an input/output (I/O) subsystem. Data is transferred between main memory ("system memory") and processor subsystem over a memory bus, and between the processor and I/O subsystems over a system bus. Examples of the system bus may include the conventional lightning data transport (or hyper transport) bus and the conventional peripheral component [computer] interconnect (PCI) bus. Each network node may also comprise other hardware units/modules coupled to system bus for performing additional functions. The processor subsystem may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

Figure 1:
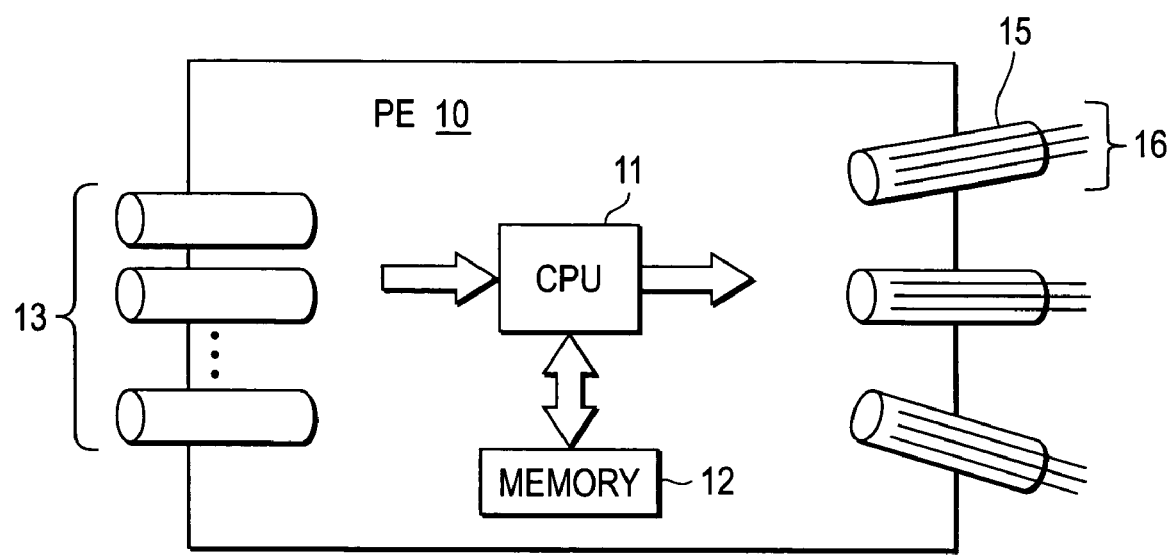
- FIG. 1 is conceptual diagram that illustrates a PE device in accordance with one embodiment of the present invention.

FIG. 1 is a conceptual block diagram of one embodiment of a PE device 10 in accordance with the VPLS model of the present invention. PE device 10 includes a processing engine (CPU) 11 coupled with a main memory 12. CPU 11 processes packets received by a plurality of physical ports 13 facing toward one or more CE devices. After processing, packets are delivered to one or more output ports 15 that face toward the SP network core. Each port 15 includes one or more PWs 16.

In accordance with the present invention, each PW 16 functions as a logical link (e.g., an IEEE 802.1Q specification trunk) between bridge components of two PE devices. This is a departure from the prior art use of PWs as part of VLAN emulation. That is, according to the traditional VPLS model, a full mesh of PWs of a service instance emulates a provider VLAN with respect to the bridge component of a PE device. However, in accordance with the present invention, the VLAN emulation model is discarded and each PW functions like a logical link transport mechanism that carries the provider VLANs. According to the VPLS model of the present invention, each VPLS instance is identified by an extended VLAN (E-VLAN) tag that is generated by CPU 11 of PE device 10. Basically, CPU 11 converts the incoming SP VLAN tag associated with packets arriving at ports 13 into the E-VLAN tag format that is sent across the SP core network.

Figure 2:
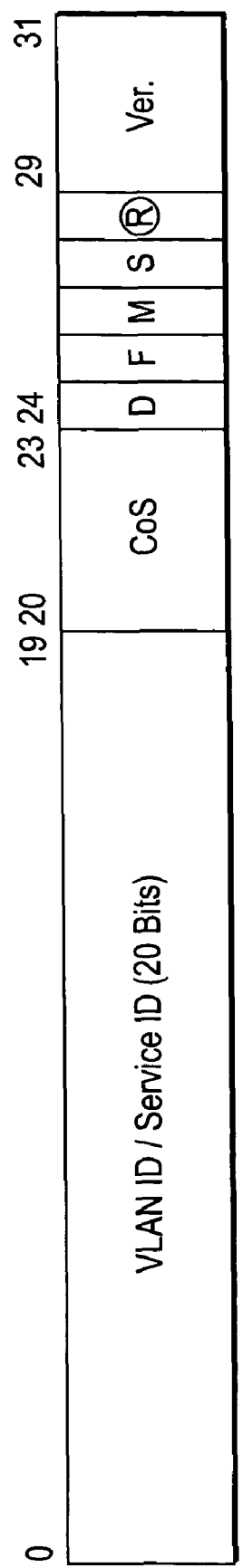
FIG. 2 shows one embodiment of the extended VLAN format utilized in accordance with the present invention.

FIG. 2 shows the E-VLAN tag format in accordance with one embodiment of the present invention. An Ethertype associated with the E-VLAN may be used to identify this extended tag in an Ethernet frame. A key feature of the E-VLAN tag format is a 20-bit VLAN ID/Service ID field that allows identification, in certain applications, of up to one million different service instances. Also included is a 4-bit Class of Service (CoS) field, a Discard eligible (D) bit, a FCS (F) bit, a customer MAC address encapsulation (M) bit, and a stack (S) bit that indicates that VLAN stacking is utilized in the data packet format. Setting of the M bit indicates the entire customer frame, including the customer's MAC address, is encapsulated in the Ethernet frame. In cases where the M bit is set, the provider MAC address is used for tunneling through the SP network. These latter two features will be discussed in more detail below.

In one implementation, the E-VLAN tag of FIG. 2 is utilized as a VPLS service instance identifier (i.e., customer VPN ID), with the E-VLAN tag being embedded within the Ethernet frame. In this manner, up to one million service instances may be supported in transmission across the SP core network.

Figure 3:
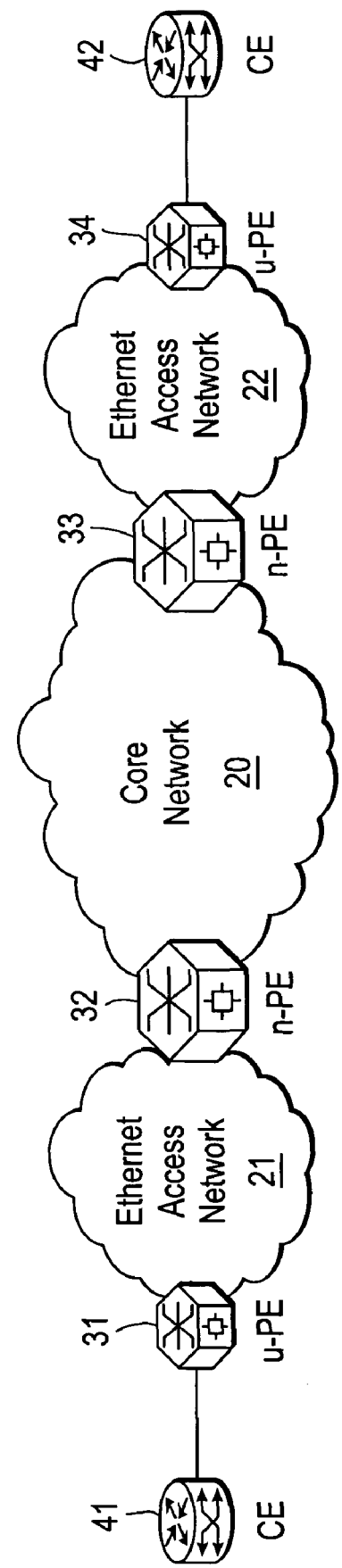
FIG. 3 is a diagram of a service provider network using the extended VLAN mechanism to identify a VPLS instance according to one embodiment of the present invention.

FIG. 3 is a simplified example of a SP network in accordance with one embodiment of the present invention in which a core network 20 is shown connected to a pair of Ethernet access networks 21 & 22 via network provider edge (n-PE) devices 32 & 33, respectively. User-facing provider edge (u-PE) devices 31 & 34 connect respective customer edge (CE) devices 41 & 42 to Ethernet access networks 21 & 22. In this illustration, n-PE devices 32 and 33 are implemented in accordance with the PE device model shown in FIG. 1. That is, for traffic passing from left to right in FIG. 3, n-PE device 32 maps the 12-bit provider VLAN ID associated with customer edge device 41 into a 20-bit E-VLAN tag identifier that is then sent over core network 20. At the other end, n-PE device 33 translates the 20-bit E-VLAN tag back to a standard 12-bit provider VLAN ID, which eventually passes to CE device 42 at the destination end.

Figure 4:
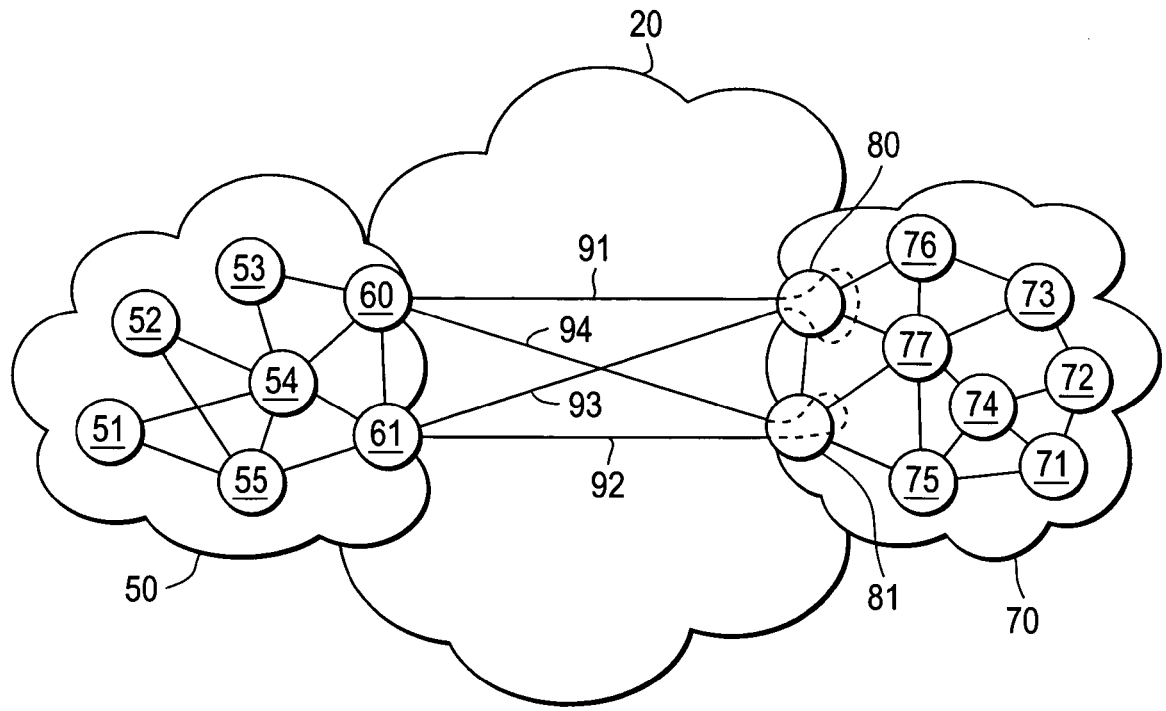
FIG. 4 is a network diagram that illustrates a redundancy mechanism utilized in accordance with one embodiment of the present invention.

It is appreciated that each of the u-PE and n-PE devices shown in the embodiment of FIG. 4 are configured to both convert 12-bit VLAN IDs into E-VLAN identifiers in the direction across core network 20, and to convert E-VLAN identifiers into 12-bit VLAN IDs in the direction from core network 20 to the CE device. In other words, the PE devices 32 & 33 at the edge of the core and access networks are capable of handling both ingress and egress traffic in the manner described above. By way of example, processing of the identifiers may be performed by a software routine running on CPU 11 of the corresponding PE device.

Note that in accordance with the present invention, the filtering database normally associated with each customer is unchanged; that is, the filtering database is used as before (prior model) for each customer. But instead of using a full mesh of PWs to designate a broadcast domain over the core network (i.e., to emulate a provider VLAN), the E-VLAN mechanism described above is utilized. To limit the broadcast domain associated with a provider VLAN (or VPLS instance) over a set of PWs, a modified version of GARP (Generic Attribute Registration Protocol) VLAN Registration Protocol (GVRP) is run, which modified version is herein referred to as Extended GVRP (E-GVRP), among the PE devices (or n-PE devices only). GVRP is a known application defined in the IEEE 802.1Q standard that allows for the control of 802.1Q VLANs, i.e., 802.1Q-compliant VLAN pruning and dynamic VLAN creation on 802.1Q trunk ports. GVRP basically allows a switch to exchange VLAN configuration information with other GVRP switches, prune unwanted VLANs and their associated broadcast, multicast, and unicast traffic, and dynamically create and manage VLANs on switches connected through 802.1Q trunk ports.

The E-GVRP is essentially a compact GVRP that has a coding used to compress the VLAN information for up to 4K VLANs into a single Ethernet frame. In the E-GVRP, a jumbo Ethernet frame is utilized to carry the information needed for a large number of E-VLANs. Like GVRP, E-GVRP only runs among PE devices (or n-PEs); it does not interfere with and runs independently from each access domain's GVRP. Using E-GVRP each PE device may indicate to other PE devices what VPLS instances (E-VLANs) it is interested in on a given PW. Thus, the other PE devices may operate by only sending traffic from those VLANs over that PW, thereby limiting the scope of broadcast domain for each E-VLAN.

It should be understood that the Multiple VLAN Registration Protocol (MVRP) may also be utilized in conjunction with the present invention in replacement for GVRP for the purposes of auto-discovery and notification of active VLANs.

FIG. 4 is a network diagram that illustrates how redundancy is handled in accordance with one embodiment of the present invention. FIG. 4 shows access domains (i.e., islands) 50 and 70 on opposite sides of core network 20. In FIG. 4, n-PE devices 60 & 61 connect with nodes 51-55 of island 50, and n-PE devices 80 & 81 connect with nodes 71-77 of island 70. A full mesh of PWs 91-94 connects n-PE devices 60 & 61 with n-PE devices 80 & 81.

Each of islands 50 and 70 runs its own Spanning Tree Protocol (STP), or some variant of STP, e.g., MSTP or RSTP. As is well known, switches in a network running STP gather information about other switches in the network through an exchange of control messages called Bridge Protocol Data Units (BPDUs). BPDUs contain information about the transmitting switch and its ports, including its switch and port Media Access Control (MAC) addresses and priorities. The exchange of BPDU messages results in the election of a root bridge on the network, and computation of the best path from each switch to the root switch. To provide path redundancy, STP defines a tree from the root that spans all of the switches in the network, with certain redundant paths being forced into a standby (i.e., blocked) state. If a particular network segment becomes unreachable the STP algorithm reconfigures the tree topology and re-establishes the link by activating an appropriate standby path.

Figure 5:
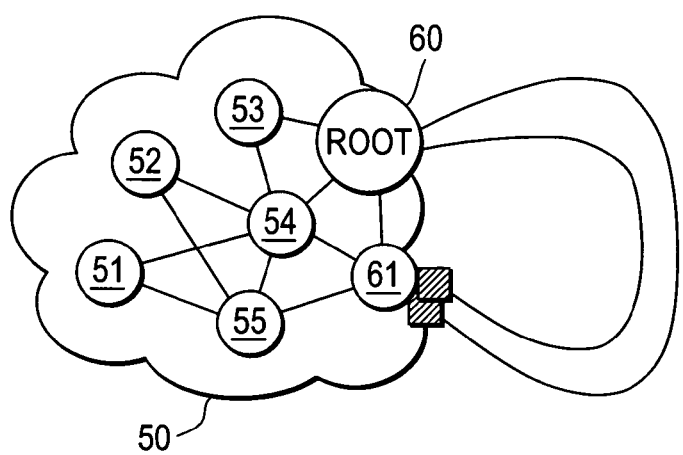
FIG. 5 is a partial network diagram that shows virtual trunk blocking in accordance with one embodiment of the present invention.

According to one embodiment, link and node level redundancy is achieved by BPDU loopback at the remote n-PE device. In the example shown in FIG. 4, a BPDU packet sent by n-PE devices 60 or 61 across any of PWs 91-94 is looped back via another PW. This loopback operation is indicated by the dashed lines in FIG. 4 shown connecting PW 91 & 93 and PW 92 & 94. By looping the BPDU back, it looks to the island (e.g., island 50) sending the BPDU as if the two PWs are actually connected together (i.e., like a LAN segment). This means that the local STP in island 50 running over n-PE devices 60 & 61 can block the appropriate virtual trunk, thus providing redundancy. This blocking function is illustrated in FIG. 5 by the shaded blocks at n-PE device 61 for each of the two PW paths from n-PE device 60 to n-PE device 61 (looped back at the remote n-PE devices 80 & 81). For instance, one path from n-PE device 60 to n-PE device 61 includes PWs 91 & 93, while the other path includes PWs 94 & 92.

Practitioners will appreciate that the examples of FIGS. 4 & 5 illustrate how the provider BPDU path is exactly the same as that of the provider data.

In addition, since PWs function as a transport mechanism for VPLS identifiers in the present invention, either full or partial meshes may be implemented among the n-PE devices so connected across the core network. In other words, problems caused by partial meshes in the prior art VPLS model are obviated in the present invention since PWs are no longer part of an emulated VLAN. Instead, PWs are used as logical links, which means that bridge protocols may be leveraged to take care of PW failures. The present invention also allows for an efficient recovery mechanism since a single PW failure does not result in a PE failure (as was often the case in the prior art). Furthermore, Ethernet OAM protocol (IEEE 802.1ag) can be readily applied to the VPLS model of the present invention.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer (e.g., a server) to a requesting computer (e.g., a customer or client) by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

I claim:

1. A processor-implemented method of operation for a network-facing provider edge device (n-PE) of a core network, the method comprising:
   receiving a packet from an access network, the packet having a first Virtual Local Area Network (VLAN) tag of a first predetermined bit length;
   mapping the service instance identifier of the first VLAN tag into a second VLAN tag of a second predetermined length greater than the first predetermined bit length, the second VLAN tag identifying a Virtual Private LAN service (VPLS) instance;
   sending the packet with the second VLAN tag across a service provider (SP) core network via a pseudowire (PW) that functions as a logical link that carries a provider VLAN to another PE device; and
   executing an application that exchanges VLAN configuration information with other network devices;
   wherein mapping the service instance identifier includes generating the second VLAN tag based on the exchanged VLAN configuration information.

2. The processor-implemented method of claim 1 wherein the application comprises a version of GARP (Generic Attribute Registration Protocol) VLAN Registration Protocol (GVRP).

3. The processor-implemented method of claim 1 wherein core network comprises a Multi-protocol label switching (MPLS)/Internet Protocol (IP) network.

4. A processor-implemented method of operation for a network-facing provider edge (n-PE) of a core network, the method comprising:
   receiving a packet from an access network, the packet being in a first format and including a first Virtual Local Area Network (VLAN) tag of a first predetermined bit length;
   converting the packet from the first format into a second format in which the first VLAN tag is mapped into a second VLAN tag having a second predetermined bit length format, the second predetermined bit length being greater than the first predetermined bit length; the second VLAN tag identifying a Virtual Private LAN Service (VPLS) instance and being embedded within an Ethernet frame; and
   sending the packet with the second VLAN tag across a service provider (SP) core network via a pseudowire (PW) that functions as a logical link that carries a provider VLAN to another PE device
   executing an application that exchanges VLAN configuration information with other network devices;
   wherein mapping the service instance identifier includes generating the second VLAN tag based on the exchanged VLAN configuration information.

5. The processor-implemented method of claim 4 wherein the logical link comprises an IEEE 802.1Q-compatible trunk.

6. The processor-implemented method of claim 4 wherein the access network comprises an Ethernet access network.

7. The processor-implemented method of claim 4 wherein the application comprises a version of GARP (Generic Attribute Registration Protocol) VLAN Registration Protocol (GVRP).

8. A network-facing provider edge (n-PE) device comprising:
   a port to receive a packet from an access network, the customer frame having a first Virtual Local Area Network (VLAN) tag of a first predetermined bit length, the first VLAN tag including a service instance identifier; and
   a processing unit that converts the packet from the first format into a second format in which the service instance identifier of the first VLAN tag is mapped into a second VLAN tag having a second predetermined bit length format, the second predetermined bit length being greater than the first predetermined bit length, the processing unit being operable to send the packet in the second format across a service provider (SP) core network via a pseudowire (PW) that functions as a logical link that carries a provider VLAN to a second n-PE device;
   wherein the processing unit is further operable to execute an application that exchanges VLAN configuration information with the second n-PE device, and wherein the processing unit is further operable to generate the second VLAN tag based on the exchanged VLAN configuration information.

9. The n-PE device of claim 8 wherein the logical link comprises an IEEE 802.1Q-compatible trunk.

10. The n-PE device of claim 8 wherein the application comprises a version of GARP (Generic Attribute Registration Protocol) VLAN Registration Protocol (GVRP).

11. A provider edge device comprising:
    a plurality of ports; and
    means for receiving a packet received at one of the ports in a first format, the first format including a first Virtual Local Area Network (VLAN) tag of a first predetermined bit length, the first VLAN tag including a service instance identifier, and for converting the packet into a second format in which the service instance identifier of the first VLAN tag is mapped into a second VLAN tag having a second predetermined bit length format, the second predetermined bit length being greater than the first predetermined bit length, the means also for embedding the second VLAN tag in an Ethernet frame and seconding the frame across a service provider (SP) core network via a pseudowire (PW) that functions as an IEEE 802.1Q-compatible trunk link that carries a provider VLAN to a second n-PE device;
    wherein the means for converting the packet into a second format is further operable to execute an application that exchanges VLAN configuration information with the second n-PE device, and wherein the means for converting the packet into a second format is further operable to generate the second VLAN tag based on the exchanged VLAN configuration information.

12. A service provider (SP) network, comprising:
    a core network that includes a plurality of network-facing provider edge (n-PE) devices connected by a set of pseudowires (PWs), each of the PWs functioning as a logical link that carries a provider VLAN between a pair of n-PE devices;
    a first Ethernet access network configured to transmit a packet of a first format that includes a first Virtual Local Area Network (VLAN) tag having a 12-bit length to a first n-PE device of the core network, the first n-PE device being operable to convert the packet into a second format in which the first VLAN tag is mapped to a second VLAN tag of a 20-bit length that identifies a Virtual Private LAN Service (VPLS) instance, the first n-PE device being further operable to embed the second VLAN tag in an Ethernet frame and send the frame across the core network to a second n-PE device via a first PW, the second n-PE device being operable to convert the packet back to the first format; and
    a second Ethernet access network configured to deliver the packet received in the first format from the second n-PE device to a user-facing provider edge (u-PE) device that connects with a customer site;

wherein each of the first and second n-PE devices is further operable to execute an application that exchanges VLAN configuration information, and wherein the first n-PE device is further operable to generate the second VLAN tag based on the exchanged VLAN configuration information.

13. The SP network of claim 12 wherein the application comprises a version of GARP (Generic Attribute Registration Protocol) VLAN Registration Protocol (GVRP).

14. The SP network of claim 12 wherein the core network further includes third and fourth n-PE devices connected with the first and second Ethernet access networks, respectively.

15. The SP network of claim 14 wherein the mesh is a full mesh, wherein a second PW connects the third and fourth n-PE devices, a third PW connects the first and fourth n-PE devices, and a fourth PW connects the third and second and third n-PE devices.

16. The SP network of claim 15 wherein each of the first and third n-PE devices, and the second and fourth n-PE devices, respectively associated with the first and second Ethernet access networks, are operable to run a local Spanning Tree Protocol (STP).

17. The SP network of claim 15 wherein the second n-PE device is operable to loop back a Bridge Protocol Data Unit (BDPU) packet received from the first n-PE device via the first PW to the third n-PE device via the fourth PW.

* * * * *